United States Patent [19]

Swanhart

[11] Patent Number: 4,589,588
[45] Date of Patent: May 20, 1986

[54] COLLAPSIBLE, REUSABLE SHIPPING CONTAINER

[75] Inventor: David E. Swanhart, Trenton, N.J.

[73] Assignee: Trent Box Manufacturing Co., Inc., Trenton, N.J.

[21] Appl. No.: 658,011

[22] Filed: Oct. 5, 1984

[51] Int. Cl.$^4$ .......................... B65D 5/02; B65D 88/10
[52] U.S. Cl. ..................................... 229/41 R; 220/7; 229/45 R; 229/46
[58] Field of Search .................. 220/1.5, 6, 7; 217/15, 217/47, 66; 229/41 R, 41 B, 44 R, 45 R, 46, 47, 6 R, 16 R, 50, 49; 49/129, 142, 371; 312/108, 258, 259, 260; 206/600

[56] References Cited

U.S. PATENT DOCUMENTS

| Re. 16,509 | 12/1926 | Burkholder | 229/46 |
|---|---|---|---|
| 763,142 | 6/1904 | Bisler | 229/41 R |
| 1,160,871 | 11/1915 | Forward | 229/50 |
| 1,221,900 | 4/1917 | Palmer | 229/6 R |
| 1,307,638 | 6/1919 | Pridham | 229/31 R |
| 1,420,148 | 6/1922 | Rock | 217/66 |
| 1,468,229 | 9/1923 | Elliott | 229/44 R |
| 1,906,964 | 5/1933 | Hill | 229/37 R |
| 2,374,539 | 4/1945 | Guyer | 229/23 C |
| 2,761,609 | 9/1956 | Arkin | 229/23 R |
| 2,962,203 | 11/1960 | Fallert | 229/41 R |
| 3,003,680 | 10/1961 | Wilcox, Jr. | 229/41 R |
| 3,119,545 | 1/1964 | Gullikson | 229/16 R |
| 3,126,140 | 3/1964 | Lizan et al. | 229/16 R |
| 3,542,637 | 11/1970 | Zoia | 229/45 R |
| 3,667,666 | 6/1972 | Pryor | 229/16 B |
| 3,746,203 | 7/1973 | Cipolla | 220/6 |
| 3,966,075 | 6/1976 | Schultz | 220/1.5 |
| 4,094,458 | 6/1978 | Nelson, Jr. | 229/39 R |
| 4,167,242 | 9/1979 | Kupersmit | 229/45 R |
| 4,508,237 | 4/1985 | Kreeger et al. | 220/7 |

FOREIGN PATENT DOCUMENTS

| 1471597 | 1/1967 | France | 229/16 R |
|---|---|---|---|
| 160605 | 5/1933 | Switzerland | 229/46 |
| 25995 | of 1907 | United Kingdom | 229/41 R |
| 2123789 | 2/1984 | United Kingdom | 206/600 |

Primary Examiner—William Price
Assistant Examiner—Gary E. Elkins
Attorney, Agent, or Firm—Sperry, Zoda & Kane

[57] ABSTRACT

A collapsible shipping container, especially adapted for the transportation of freight by air, is formed of material that inherently possesses a high degree of strength in relation to its weight and may, to this end, be constructed primarily of heavy-duty corrugated paperboard or the like. The container is fully collapsible to a flattened condition. Incorporated in the container is a special capability for retention of door panels in both their folded and their outwardly swung, use positions. This characteristic is imparted to the container structure by the use of flexible loops adjustable as to size. One of these is threaded through openings of one door panel, while the other is similarly connected to another door panel so as to travel therewith between the folded and extended or use positions of those panels. The other door panels are provided with slots, so that the loops can separably engage adjacent panels both in the collapsed and use positions of the container.

14 Claims, 9 Drawing Figures

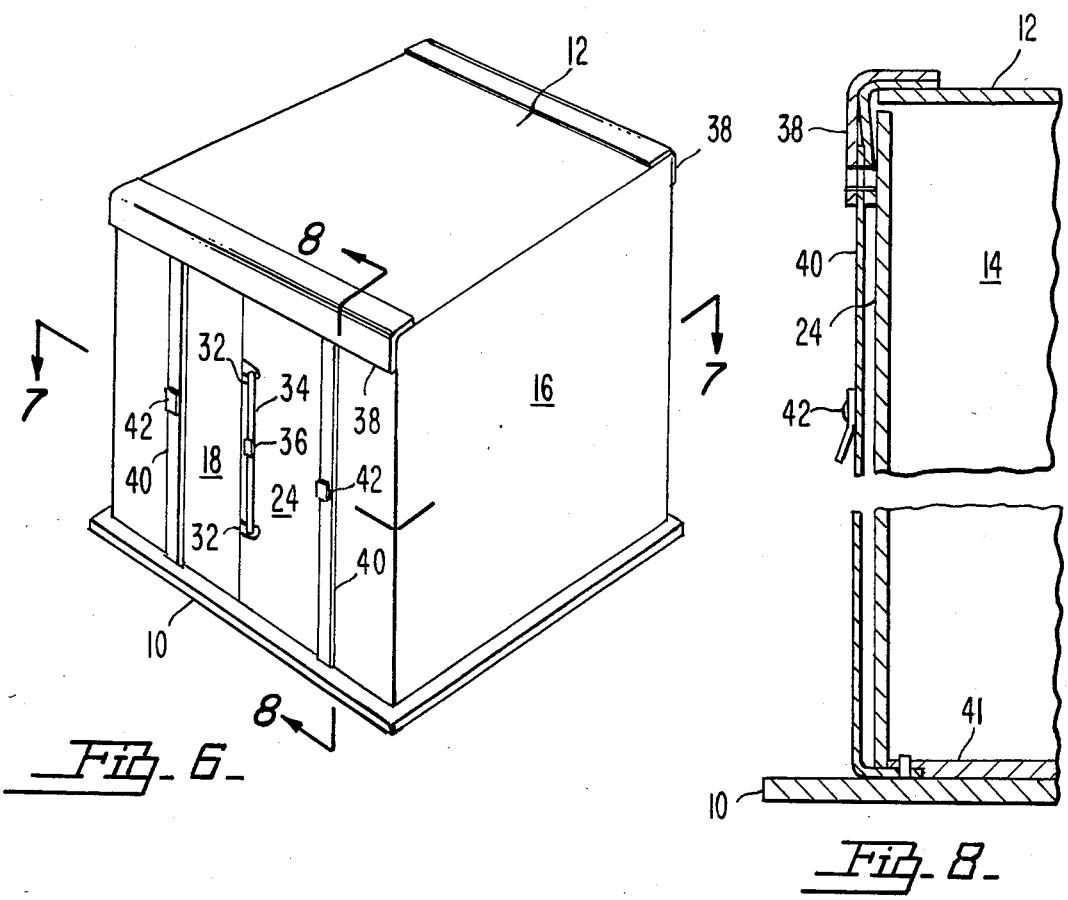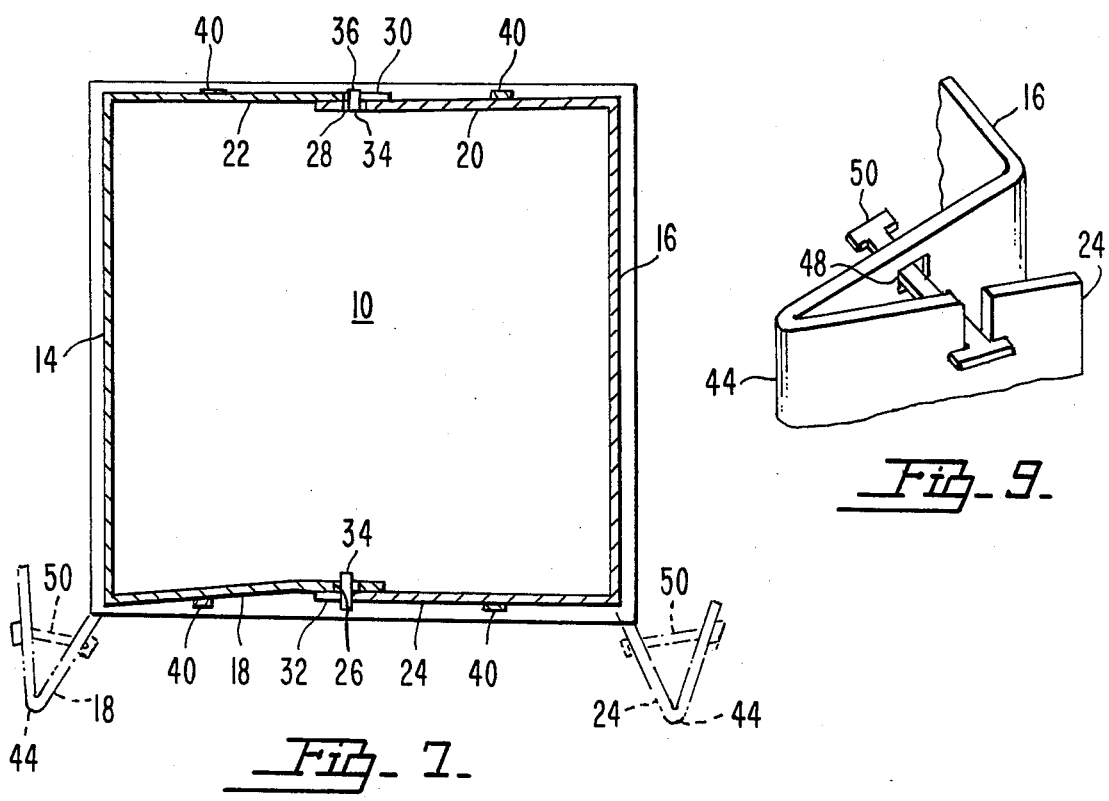

COLLAPSIBLE, REUSABLE SHIPPING CONTAINER

BACKGROUND OF THE INVENTION

1. Field of the Invention

The present invention, generally speaking, relates to strong but relatively lightweight, collapsible containers, specifically designed for reuse rather than for discard after utilization thereof for the purpose of shipping freight or similar materials. In a more specific sense, the invention relates to collapsible containers, which in their folded conditions are adapted to be formed to a generally flattened shape, thus permitting storage or stacking thereof in a relatively small area to facilitate their return to a point at which reuse of the containers is to occur. Again in a more specific sense, the invention relates to containers of this general type or category, having special means for retention of swingable panels or flaps both in their folded positions, and in their use positions.

2. Description of the Prior Art

Collapsible containers, formed of heavy-duty corrugated paperboard or the like, have of course been very well known, for a long period of time. These have taken a wide variety of shapes, and have incorporated a similarly great variety of folding arrangements.

When such a container is intended for reuse over a long period of time, it is of great importance that the container be made not only strongly, but also, in such a way as to facilitate the swift collapse, and the equally swift unfolding thereof, in order to reduce labor costs and permit a substantial number of the containers either to be folded away or opened up for reuse, in a minimum period of time.

Heretofore, containers of this type have been generally unsatisfactory for heavy-duty use, and especially has this been true with respect to containers designed for use in transporting freight by air.

Air freight transportation presents special problems, that must be overcome in order to permit foldable, reusable containers to be employed advantageously. One important consideration is that the container must be very strong, that is, exceptionally resistant to damage or breakage, in relation to its capacity and its own weight. Achieving these desirable ends has not, however, been possible with air freight containers previously devised. Most usually, the achievement of one important purpose has been to the detriment of another.

The above reference to weight is of special significance. Passenger airlines regard it as extremely important that fuel consumption rates be reduced to the minimum. Use of the present invention, which weighs about 100 lbs. in a typical embodiment, instead of aluminum containers of the same capacity (weighing about 250 lbs. each) can lighten an aircraft by a total of about 2500 lbs. Particularly on long distance flights, when fuel must be jealously husbanded, this saving on flight after flight becomes very important. If, then, the container of the present invention is usable for a total of about 25 or 30 flights, it pays its way many times over, as compared to a conventional aluminum container which is usable a greater number of times but only at the expense of a significantly greater consumption of fuel.

The present invention has as its main object therefore, the provision of reusable, collapsible air freight containers that will achieve all of the desirable characteristics noted above, while yet being capable of manufacture at comparatively low cost considering the advantages realizable from the use thereof.

SUMMARY OF THE INVENTION

Summarized briefly, the present invention contemplates a container which in a preferred embodiment is made almost wholly of heavy-duty corrugated paperboard of the like. This type of material is well known in the art as possessing a high degree of strength in relation to its own inherent weight.

The container constructed according to the present invention, briefly described, comprises a rigid base of plywood or the like, and a foldable structure of heavy paperboard thereon having a pair of opposed side walls, a top wall, and opposed pairs of door panels, forming a generally rectangular, box-like enclosure. This enclosure would normally be of substantial size when used for its main, intended purpose of transporting air freight.

The side and top walls, according to the present invention, are formed with score lines along their edges. Thus, with the door panels folded inwardly, the structure can be completely collapsed into a generally flattened shape especially adapted to facilitate its being shipped from the factory, or stacked or stored, awaiting its next use.

Integrally and hingedly connected to the respective side walls are pairs of door panels, which in their outwardly swung positions, overlap and form end walls for the rectangular container. An important characteristic of the invention is found in the fact that the door panels, when folded inwardly in the collapsed condition of the container, overlap and cause openings of one of the door panels to register with slots formed in the other door panel connected to the same side wall. Flexible loops are extended through the registering openings and slots, and are tightened to completely collapse the door panels against the associated side wall to which they are both integrally joined.

The same arrangement is provided on the opposite side wall, except that where the door panel of one side wall has openings, the corresponding door panel of the other side wall has slots; and correspondingly, where the door panel connected to one side wall has slots, the corresponding door panel of the other side wall has openings.

When the container is erected, the slotted door panel at one end of the container now overlaps with a door panel at the same end having openings, and the slotted door panel at the other end of the container now overlaps with the door panel at that end that has openings formed in it. The flexible loops are now once again in position to be engaged with the openings and slots of overlapping panels in the use position of the container, in exactly the same way that they were so engageable in the collapsed position of the container. Again, the loops can be tightened, to retain the outwardly swung, overlapping, extended door panels in their use positions. Thereafter, protective cover flaps on the top wall are swingable into position over the extended door panels, and external straps are tightened about the container, so as to further reinforce the same against damage or breakage while it is in transit, filled with the passengers' luggage or with freight.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawings, in which:

FIG. 6 is a perspective view of the fully erected container as it would appear after being fully loaded, with the doors in their closed positions, and with all retaining straps buckled tight to permit shipment of the loaded container;

FIG. 7 is a horizontal sectional view substantially on line 7—7 of FIG. 6, illustrating the doors in their closed positions in full lines, and illustrating the doors in dotted lines in positions to which they may be swung outwardly and folded to facilitate loading of the container;

FIG. 8 is an enlarged, fragmentary vertical sectional view, portions being broken away, substantially on line 8—8 of FIG. 6; and FIG. 9 is a fragmentary perspective view illustrating the means for holding the doors in the outwardly swung position illustrated in dotted lines in FIG. 7.

DETAILED DESCRIPTION OF THE PREFERRED EMBODIMENT

Figure 1:
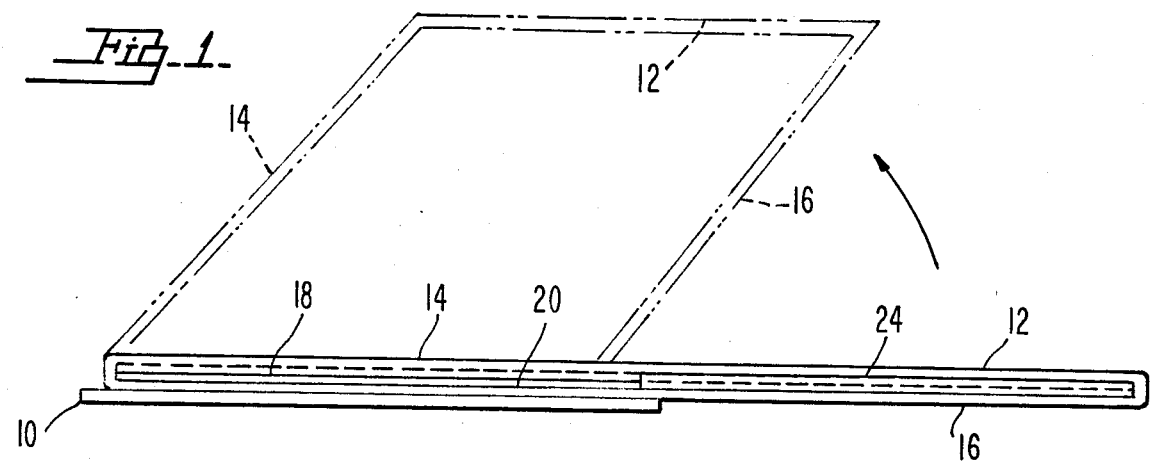
FIG. 1 is an end elevational view of a collapsible container according to the present invention, as it appears when in its fully collapsed condition, ready for stacking or storage with other, similar, collapsed containers, the dotted lines showing the container partially erected for use.

Referring to the drawing in detail, at the outset it should be noted that a container according to the present invention will normally be fully loaded with such items as passenger luggage or the like, after which the container in a fully loaded, closed, secured position is itself loaded into the luggage compartment of the aircraft. To this end, a container of the type illustrated and described herein will normally be about $5' \times 5' \times 5'$, would itself weigh perhaps 100 lbs., and would be adapted to carry luggage or other objects weighing many hundreds of pounds.

While these particular dimensions can be varied, a container of this type must, obviously, be very strong, while still being very light in relation to its capacity and size. And, it is also very desirable that the container be reusable a maximum number of times. Still further, the container should desirably be capable of being folded flat, to permit it to be stored or stacked when not in use, or returned to its destination in a flattened condition, and also to permit it to be shipped from the manufacturing plant to the destination at which it is to go into service.

With these requirements kept in mind, the container according to the present invention, includes a flat, rectangular, rigidly constituted, strong base 10, preferably formed of heavy-duty plywood. The remaining wall areas of the container are formed of a heavy-duty, strong paperboard, which may desirably be of the corrugated type to add strength and body thereto, while yet retaining the characteristic of lightness in relation to its basic strength and durability.

Accordingly, secured to the body is a wall structure that includes a top wall 12, of heavy paperboard material, integral along its opposite side edges with side walls 14, 16 respectively. At the connection of the side walls to the edges of the top wall, fold or score lines are provided to facilitate the folding flat of the entire structure into the form shown in full lines in FIG. 1, whereby the container can be shipped in a flattened condition, stored, or stacked with other similarly flattened containers, in a manner to occupy a minimum amount of space when not in use.

Hereinafter, the terms "vertical" and "horizontal" will be used, and will refer to the positions assumed by the various component parts of the device when it is ready for use or is in use as a fully erected container such as shown, for example, in FIGS. 2, 3, 6, and 7. Thus, integral with one vertical end edge of the first side wall 14 is a first door 18, which in the use condition of the container extends the full vertical dimension of the side wall (see FIG. 6).

At this point, it may also be noted that hereinafter, to facilitate understanding of the construction, the first and second walls 14, 16 respectively will be designated as the "sides" of the container, while the doors, integrally hinged thereto will be understood as opening or closing the "ends" of the container.

Integrally hinged to the second side wall 16, at the other end of the container, is another first door 20. At said other end of the container, a second door 22 is integrally hinged to the side wall 14, while at the first named end of the container, another second door 24 is integrally hinged to the second side wall 16 of the container. All of this is shown to particular advantage in FIG. 3 of the drawing.

Figure 2:
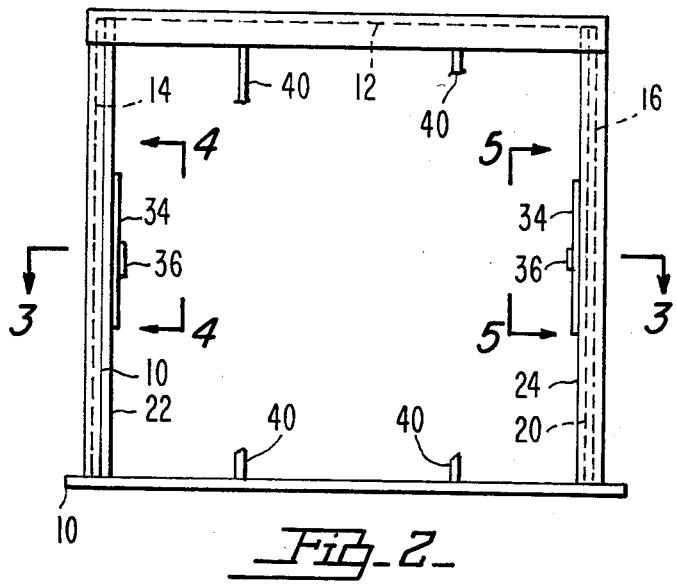
FIG. 2 is an end elevational view of the fully erected container, with the doors in their inwardly folded and secured positions, and with a pair of retaining straps being partially broken away.

When the device is folded flat as in FIG. 1, or when it is initially erected as in FIG. 2 with both ends fully open, the first doors 18, 20 are folded flat against their associated first and second side walls 14, 16 respectively. The second doors 22, 24 are also folded flat, partially overlapping the first doors 18, 20 respectively (see the full line showing of FIG. 3).

Figure 3:
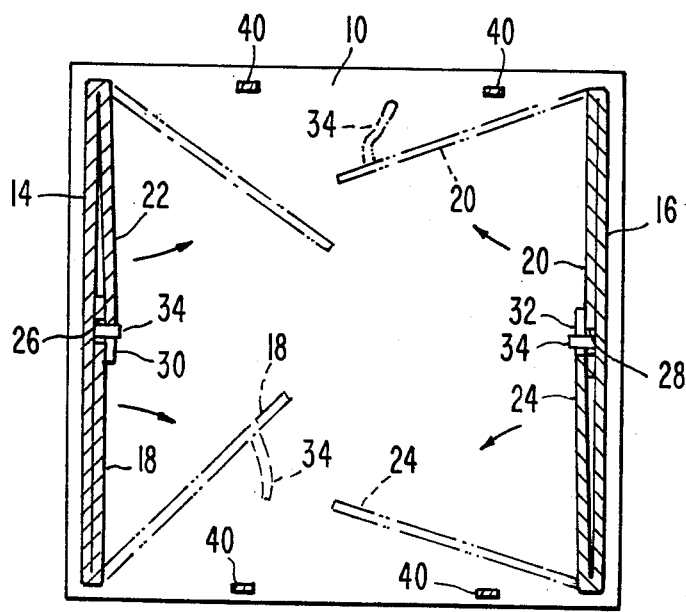
FIG. 3 is a horizontal sectional view substantially on line 3—3 of FIG. 1, the doors being shown in full lines in their inwardly folded and secured positions, and in dotted lines partially swung outwardly from said positions.

This is the position of the doors when the entire device is folded flat as in FIG. 1, and also when it is initially erected with both ends fully open, as shown in FIGS. 2 and 3.

Figure 4:
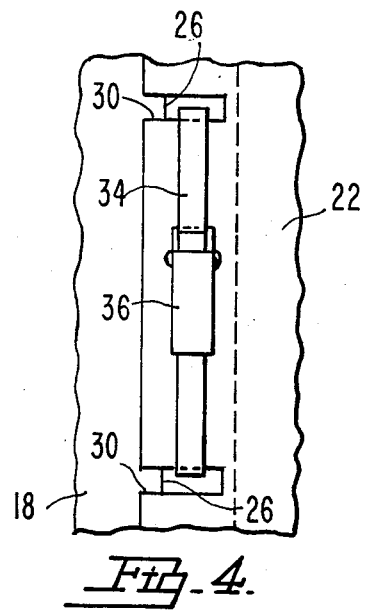
FIG. 4 is an enlarged, fragmentary elevational view substantially on line 4—4 of FIG. 2, illustrating the means for retaining the doors at one side of the container in their inwardly folded positions.

At this time, the inwardly folded doors 18, 22 are secured together, and the inwardly folded doors 20, 24 are also secured together, flat against their associated side walls 14, 16 respectively. The manner in which they are formed and secured will be seen to particular advantage in FIGS. 4 and 5. Thus, in FIG. 4 doors 18, 22 are illustrated in overlapped, inwardly folded and secured positons. Door 18, adjacent its free vertical edge, is formed with apertures 26, 26. Door 22 is formed, along its vertical free edge, with vertically spaced slots 30, 30 opening upon said free edge in registration with the apertures 26, 26.

Figure 5:
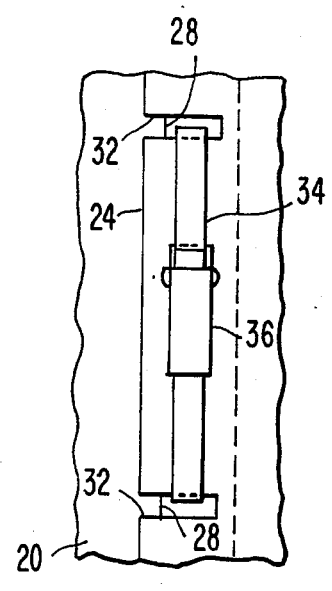
FIG. 5 is a view similar to FIG. 4, taken substantially on line 5—5 of FIG. 2, showing the doors at the other side of the container in their inwardly folded positions.

In similar fashion, as shown in FIG. 5 doors 20, 24 are formed with openings 28 and slots 32 respectively.

Connecting the doors 18, 22 together in their inwardly folded, overlapped relationship is a door-retaining strap 34. This is extended through the openings 26, after which the door 22 is swung into overlying relation to the door 18. This locates the slots 30 in registration with the openings 26, after which the ends of the strap are brought together over the door 22, and a buckle 36 is pulled tight and secured, to tighten this strap so that it will securely hold both doors together in their fully inwardly folded, flattened condition against their associated side wall 14, in the positions shown in FIG. 2 and FIG. 3.

In similar fashion, the doors 20, 24 are folded flat aginst their associated side wall 16, as shown in FIG. 3, and with their openings 28 and slots 32 in registration, the strap 34 carried by door 20 is tightened over the door 24, to hold the doors 20, 24 securely in their inwardly flattened position. This is the way the doors are secured when the device is initially made and shipped as a fully collapsed container. When the container is erected, following the direction arrows shown in FIG. 1, and when it ultimately moves to a fully erected state as shown in FIGS. 2 and 3, the ends of the container are fully open, and the doors 18, 22, 20, 24 are exposed for disconnection and movement to an out-of-the-way position, for facilitating loading of the container.

Thus, straps 34 are now loosened, and the doors are swung outwardly, as shown by the arrows in FIG. 3, moving through the dotted line positions shown in FIG. 3.

Typically, one end of the container will now be closed, with the doors at said end moving to the position shown in FIG. 7.

It will be noted by reference to FIG. 7, that whereas door 20, having openings 28, was initially secured to door 24 having slots 32, when these doors were in their inwardly folded, collapsed positions shown in FIG. 3, it now becomes appropriate to close one end of the container by moving these doors through the dotted line positions shown in FIG. 3, to the full line positions for doors 20, 22 shown in FIG. 7. At this time, door 22, which was initially fastened to door 18 when folded inwardly, is now adapted to be fastened to door 20. Door 22, as previously noted herein has slots 30, which were in registration with openings 26 when doors 18, 22 were in their inwardly folded, FIG. 3 positions. When moved to a position for closing one end of the container, however, doors 22, 20 now overlap, and slots 30 are now in registration with openings 28 of door 20. The strap 34 carried by door 20 is now passed through the slots 30, and secured once again, so that doors 20, 22 close the container at one end.

At the other end, the container is left open for loading of objects therein. In order to keep the doors from interfering with said loading, they are swung outwardly to the positions shown in FIG. 7 in dotted lines.

Each door, midway between its inner and outer vertical edges, is formed with a fold or score line 44, permitting the door to be folded upon itself. Thus, as shown in dotted lines in FIG. 7 and in full lines in FIG. 9, the doors at the end of the container that is to be left open for loading, are folded back upon themselves along the lines 44, to completely clear the end of the container through which the products are to be loaded.

To retain each door in its folded condition, a plastic member 50 is extendable (see FIG. 9) through an opening 48 formed in one section of the folded door, and a slot 46 opening upon the top edge of the other section of the same door. This flexible connector 50 is simply used temporarily to keep the door from unfolding and interfering with the loading of the container. When the container is fully loaded, the connecting element 50 is lifted out of the slot 46, and simply pushed inwardly within the opening 46, to hang from the door within the container, awaiting the next occasion on which the element 50 may be needed.

In any event, assuming that the container has been fully loaded, the doors 18, 24 may now be swung to the fully closed positions shown in FIG. 7 in full lines. At this time, door 18 has its openings 26 in registration with the slots 32 of door 24, whereby the strap 34 carried by the door 18 can now be secured over the door 24, passing through the slots 32 for this purpose. Strap 34 is tightened by means of the buckle 36 carried thereby, and the several doors of the container are thus fully closed and secured.

To prevent accidental outward opening of the doors under the pressure of the luggage or other materials loaded within the container, end retaining straps 40 are provided (see FIG. 6). At their upper ends, straps 40 are permanently secured to flaps 38 that are extended outwardly from the respective end edges of the top wall 12 (see FIG. 8). Flaps 38 protectively overlie the upper ends of the doors when the doors are in their closed positions shown in FIG. 7.

The lower ends of the retaining straps are permanently secured between the plywood base 10 and a paperboard floor element 41 overlying the base.

Each of the straps 40 is comprised of two sections, secured together by a buckle 42. Therefore, when the doors are closed and secured in the manner previously discussed herein, straps 40 are buckled tight across the doors as shown in FIG. 6, so as to provide added strength and reinforcement to the container, in a manner that would prevent the luggage from forcing the doors open should the weight of the housed container contents suddenly shift within the aircraft or during handling of the loaded container by ground crews.

Of course, when the container is to be unloaded, it can be opened from either end, or for that matter at both ends, to facilitate the swift unloading of the container contents. If the container is to be taken out of service and stored or shipped elsewhere without a load, the doors can be swung inwardly once again to their FIG. 3, full line positions, and the container can be knocked down to the flattened position shown in FIG. 1 to be stacked with other similarly flattened containers during storage or shipment.

A container formed according to the present invention is designed as a substitute for containers now in use, which ordinarily are formed of aluminum or similar material intended to provide strength while still possessing the characteristic of lightness in relation to the strength and capacity thereof. An aluminum container, it has been found, of the same size as a container formed according to the present invention will generally weigh about 250 lbs., as against approximately 100 lbs. for the container of the invention.

While aluminum will last longer than fiberboard or paperboard, the fact is that the fuel savings resulting from the use of the container formed according to the present invention make it very desirable that the illustrated and described container be substituted for the much heavier, aluminum containers now in widespread use.

In this connection, the container formed according to the present invention is, even so, possessed of not only the characteristic of great strength in relation to its weight, but also, can be made weather-resistant to prevent deterioration should it be left in the rain or otherwise exposed to the elements. To this end, it is desirable to make the paperboard material used for forming the container, as weather-resistant as possible. This is done by impregnating or coating the same with wax or the like. It has been found that a container that is so protected will last for perhaps 25 or 30 trips, in a fully loaded condition, before it must be discarded. The fact that it will last for so many trips fully justifies the purchase and use thereof by the airlines, since the aluminum containers that are now used for the same purpose are not only expensive, but also, as noted above are approximately 2½ times as heavy as a paperboard container of the same size and load carrying capacity. The disirable characteristics of the disclosed container, in other words, far outweigh the capability of a metal container to remain usable for more than the 25 to 30 trips envisioned for the container illustrated and described herein. Considering the fact that there may be as many as 15 to 20 containers of the type illustrated, on a single aircraft, the total weight of the aircraft is lightened by as much as 2500 lbs. This lessening of weight, on each and every trip that the aircraft makes, produces great savings in fuel. This is of importance under all occasions, of course, but is especially true when the aircraft must make a very long trip under circumstances wherein it is desired to load it with the least possible amount of fuel, consistent with the length of the trip and the necessity of maintaining a safe amount of fuel in reserve for emergencies.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A collapsible container comprising:
(a) a box-like structure having open ends and including
   (1) a base forming a bottom wall,
   (2) first and second side walls extending from the base, and
   (3) a top wall connected between the side walls;
(b) first doors on the respective side walls at opposite ends of the structure swingable between collapsed positions in which they are substantially flattened against the respective side walls and use positions in which they extend across the ends of the structure;
(c) second doors on the respective side walls at opposite ends of the structure swingable between collapsed positions in which they are substantially flattened against the respective side walls and use positions in which they extend across the ends of the structure; and
(d) means for connecting one of the first doors to one of the second doors, and the other first door to the other second door, in the collapsed positions of the doors, and for connecting said one first door to said other second door, and said other first door to said one second door, in the use position of the several doors, said connecting means comprising straps carried by the first doors, the second doors having slots formed with open ends for receiving said straps and so positioned that the strap of each first door enters the slots of first one end then the other of the second doors, in the collapsed and use positions, respectively of the doors.

2. A collapsible container as in claim 1 wherein said structure, with the several doors in their collapsed positions, is foldable to a flattened condition.

3. A collapsible container as in claim 2 wherein the top and side walls are integrally joined along scored edges thereof to facilitate the folding of said structure to a flattened condition.

4. A collapsible container as in claim 1 wherein the several doors are integrally joined to their associated side walls.

5. A collapsible container as in claim 1 wherein at least the side and top walls are of a paperboard material.

6. A collapsible container as in claim 1 wherein the side and top walls, and the doors, are of a paperboard material.

7. A collapsible container as in claim 6 wherein the base is formed of a rigid material.

8. A collapsible container as in claim 1 further including a plurality of end straps connectable over the doors between opposite walls of said structure.

9. A collapsible container as in claim 8 wherein the walls between which the end straps are connected are the top and bottom walls.

10. A collapsible container as in claim 1 further including protective end flaps overlying portions of the doors in said use position thereof.

11. A collapsible container as in claim 10 wherein the end flaps are connected to the top wall and overlie portions of the doors disposed adjacent said top wall.

12. A collapsible container comprising:
(a) a box-like structure having open ends and including
   (1) a base forming a bottom wall,
   (2) first and second side walls extending from the base, and
   (3) a top wall connected between the side walls;
(b) first doors on the respective side walls at opposite ends of the structure swingable between collapsed positions in which they are substantially flattened against the respective side walls and use positions in which they extend across the ends of the structure;
(c) second doors on the respective side walls at opposite ends of the structure swingable between collapsed positions in which they are substantially flattened against the respective side walls and use positions in which they extend across the ends of the structure; and
(d) means for connecting one of the first doors to one of the second doors, and the other first door to the other second door, in the collapsed positions of the doors, and for connecting said one first door to said other second door, and said other first door to said one second door, in the use position of the several doors, said means comprising straps carried by said first doors and adapted to be tightened over portions of the second doors, the first doors having slots registrable with the openings to receive the straps in both the collapsed and use positions of the doors.

13. A collapsible container as in claim 12 wherein the slots of said one second door register with the openings of said one first door, and the slots of the other second door register with the openings of the other first door, in the collapsed positions of the doors, the slots of said other second door registering with the openings of said one first door, and the slots of said one second door registering with the openings of said other first door, in the use positions of the doors.

14. A collapsible container comprising:
(a) a box-like structure having open ends and including
 (1) a base forming a bottom wall,
 (2) first and second side walls extending from the base, and
 (3) a top wall connected between the side walls;
(b) first doors on the respective side walls at opposite ends of the structure swingable between collapsed positions in which they are substantially flattened against the respective side walls and use positions in which they extend across the ends of the structure;
(c) second doors on the respective side walls at opposite ends of the structure swingable between collapsed positions in which they are substantially flattened against the respective side walls and use positions in which they extend across the ends of the structure; and
(d) means for connecting one of the first doors to one of the second doors, and the other first door to the other second door, in the collapsed positions of the doors, and for connecting said one first door to said other second door, and said other first door to said one second door, in the use position of the several doors, the first doors having openings, said connecting means comprising loops extended through said openings, the second doors having slots opening upon one edge thereof, the loops of each first door being adapted to be expanded to enter the slots of the respective second doors in both the collapsed and use door positions respectively, and being adapted to be tightened following said entry to maintain the connection of the first doors to the second doors in both of said positions.

* * * * *